US006003841A

United States Patent [19]

Aisenbrey et al.

[11] Patent Number: 6,003,841

[45] Date of Patent: Dec. 21, 1999

[54] SLED LIFT

[76] Inventors: Mike Aisenbrey; Beth Aisenbrey, both of 8921 42d St. NW., New Town, N. Dak. 58763

[21] Appl. No.: 09/084,364

[22] Filed: May 27, 1998

[51] Int. Cl.[6] .................... B60P 1/16

[52] U.S. Cl. .................... 254/10 R

[58] Field of Search .................... 254/10 R, 10 B, 254/10 C, 133, 134, 131

[56] References Cited

U.S. PATENT DOCUMENTS

| | | | |
|---|---|---|---|
| 217,669 | 7/1879 | Adams | 254/10 R |
| 318,145 | 5/1885 | Smith | 254/10 C |
| 711,098 | 10/1902 | Carr | 254/10 R |
| 2,511,073 | 6/1950 | McCandless . | |
| 3,136,526 | 6/1964 | Wolf | 254/10 C |
| 3,290,051 | 12/1966 | O'Brien . | |
| 3,306,579 | 2/1967 | Campbell | 254/10 R |
| 3,863,890 | 2/1975 | Ruffing | 254/10 C |
| 4,085,953 | 4/1978 | Farwell . | |
| 4,958,804 | 9/1990 | Lenius et al. . | |
| 5,135,200 | 8/1992 | Neibrandt . | |
| 5,143,352 | 9/1992 | Latimer . | |
| 5,145,154 | 9/1992 | Bastille et al. . | |
| 5,380,141 | 1/1995 | Flowers . | |
| 5,518,224 | 5/1996 | Anderson . | |
| 5,618,030 | 4/1997 | Eggert . | |

*Primary Examiner*—Robert C. Watson

*Attorney, Agent, or Firm*—Pollock, Vande Sande & Amernick

[57] ABSTRACT

A snowmobile lift comprising a base frame and a secondary frame is provided. The secondary frame is attached to the base frame by pivot members. The pivot members are used to move the secondary frame between a raised position and a lowered position with respect to the base frame. A handle is rotatably attached to the base frame and at least one raising arm is connected between the handle and the secondary frame. The handle is movable between a first position corresponding to the lowered position of the secondary frame and a second position corresponding to the raised position of the secondary frame. When the handle is moved from its first position to its second position, the raising arms pull said secondary frame into its raised position about the pivot members. A locking bar is provided to secure the secondary frame in the raised position.

13 Claims, 4 Drawing Sheets

SLED LIFT

FIELD OF THE INVENTION

The present invention relates to a device for lifting and moving a heavy object, more particularly a device for lifting a snowmobile completely off the ground so that it can be easily moved.

BACKGROUND OF THE INVENTION

Snowmobiles, are relatively easy to maneuver and operate in the snow. However, they are quite difficult to move indoors, for example, in a storage facility or a repair shop. Currently, snowmobiles must be manually lifted onto sectional dollies in order to be moved when not in operation. Snowmobiles can weigh as much as 500–600 pounds, and manual lifting by one, or even two people is obviously quite difficult. Furthermore, manually lifting an object as heavy as a snowmobile may result in a back injury. This current method of lifting and moving a snowmobile is inadequate.

Additionally, many manufacturers of snowmobiles recommend that their snowmobiles be stored with the rear tracks elevated. This relieves the load on the suspension of the snowmobile, and it prevents damage to the rear track due to the track lugs being in contact with a hard surface. Storing the snowmobile with the rear tracks elevated also prevents the tracks from coming into contact with substances which may cause deterioration of the track, for example, a spill in a repair shop. Further, in order to service the snowmobile, it is sometimes necessary to elevate the snowmobile above the ground to provide easy access to different areas of the snowmobile, such as, the shock absorbers, track, and suspension.

U.S. Pat. No. 5,135,200 to Neibrandt is a typical snowmobile jack that is used presently. Neibrandt discloses a stationary snowmobile jack which is used to lift the rear track portion of the snowmobile off the ground. A horizontal bar is attached at one end to the rear of the snowmobile. The other end of the bar is attached to a vertical rod. The rod is moved upwardly by a foot pedal to elevate the snowmobile. This device only elevates the rear of the snowmobile and does not allow the snowmobile to be maneuvered.

Two separate snowmobile lifts, one for the front and one for the back, are shown in U.S. Pat. No. 5,145,154 to Bastille et al. These devices may be used to lift either the front or the rear snowmobile off the ground. The lifts have wheels which allow them to be mobile. The wheels are provided so to make the lifts portable. However, the lifts are not designed to elevate the entire snowmobile and do not allow the snowmobile to be easily maneuvered. Other prior devices also have the same limitations.

There is a need for a snow mobile lift which enables one person to easily lift and maneuver a snow mobile into tight spaces, as well as which elevates the rear tracks of the snowmobile to allow maintenance to be performed and to prevent damage from occurring during storage.

SUMMARY OF THE INVENTION

It is an object of the present invention to provide a snowmobile lift which can be easily operated by one person and allows the snowmobile, once lifted, to be maneuvered into tight spaces.

It is another object of the present invention to provide a snowmobile lift which elevates the rear track of the snowmobile during storage to prevent damage to the rear track.

It is also an object of the present invention to provide a snowmobile lift that allows easy access to the underside of the snowmobile to perform maintenance.

These, and other objects are achieved by providing a snowmobile lift comprising a base frame and a secondary frame. The secondary frame is located above the base frame and can be moved between a lowered position and a raised position. Pivot members are attached between the base frame and the secondary frame in order to move and support the secondary frame in the raised position. The length of the secondary frame and the positioning of the pivot members are determined with regard to the weight distribution of the snow mobile so that the snow mobile is balanced on the secondary frame when in the raised position. A handle is attached to the front portion of the base frame and is used to move the secondary frame from the lowered position to the raised position to lift the snowmobile off of the ground. The handle is also used to move the lift and snowmobile to different areas. A locking bar is provided as a safety precaution in order to prevent the secondary frame from falling from the raised position. However, there is very little or no force exerted on the locking bar as the weight of the snowmobile is balanced on the secondary frame.

The base frame is supported above the ground by wheels. Thus, when in the raised position, the snowmobile lift allows an individual to easily maneuver a snowmobile into tight spaces in order to maximize storage space. The snowmobile lift can be used as a storage device to store snowmobiles with their rear tracks elevated. Additionally, the snowmobile lift may be used while performing maintenance on the snowmobile. When the lift is in the raised position, it allows easy access to the shocks, tracks and suspension in order to perform maintenance on these parts.

DETAILED DESCRIPTION OF THE INVENTION

Figure 1:
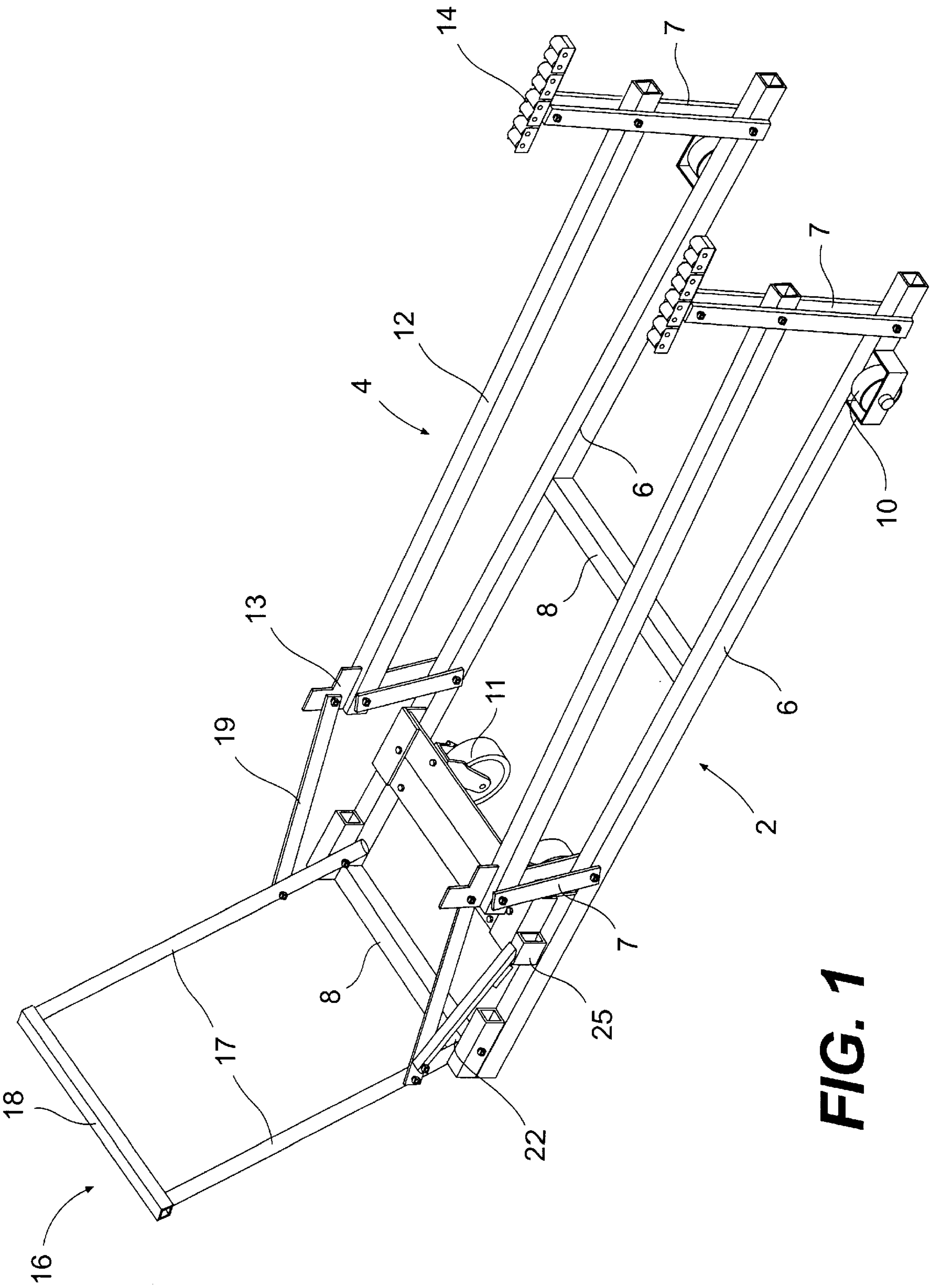
FIG. 1 is a perspective view of the snowmobile lift of the present invention in the raised position.

Referring now to FIG. 1, a preferred embodiment of the present invention comprises a base frame 2 above which a secondary frame 4 is movably supported. Both frames may preferably be constructed out of a 1½" steel square tubing. The base frame may be of any suitable configuration and is shown here as a pair of longitudinally extending parallel side rails 6. The side rails 6 are spaced apart by at least one and preferably two spacing members 8 which are welded or otherwise secured between the side rails 6. The side rails 6 should be spaced far enough apart to allow the lift to be slid under a snowmobile, approximately 22 inches. The rails 6 are substantially identical to each other and are supported above the ground at a front portion and a rear portion by two sets of wheels 10 and 11. The wheels 10 at the rear portion of the lift are sized to allow the lift to slide underneath a snowmobile and may be attached to the outside of the base frame 2 in order to keep the profile of the lift low. The wheels 10 at the rear of the lift are preferably 3" rollers and attached in a known manner. Preferably, the wheels 11 at the front portion are larger than the wheels 10 at the rear and are swivel casters in order to allow easy mobility and positioning of the lift wherever required. In FIG. 1, the front wheels 11 are shown attached under a steel plate 9 which is secured by brackets between the parallel rails. The front wheels 11 should be spaced far enough apart to provide stability for the base frame 2 and so they may freely rotate about 360°. The front wheels 11 are preferably 5" swivel casters and are bolted to the steel plate 9 through holes drilled therein.

The secondary frame also comprises a pair of parallel rails 12. Each rail 12 is movably attached to one of the rails 6 of the base frame by pivot members 7. Here, a pair of pivot members 7 is shown for each rail of the frame. Each pivot member 7 is pivotally attached at one end to the secondary frame 4 and at the opposite end to the base frame 2. The pivot members 7 are located on the base frame 2 a sufficient distance apart to provide stable support for the snowmobile when it is raised. In FIG. 1, a first pair of pivot members 7 are located towards the rear portion of the lift, and a second pair towards the front portion of the base frame.

Figure 2:
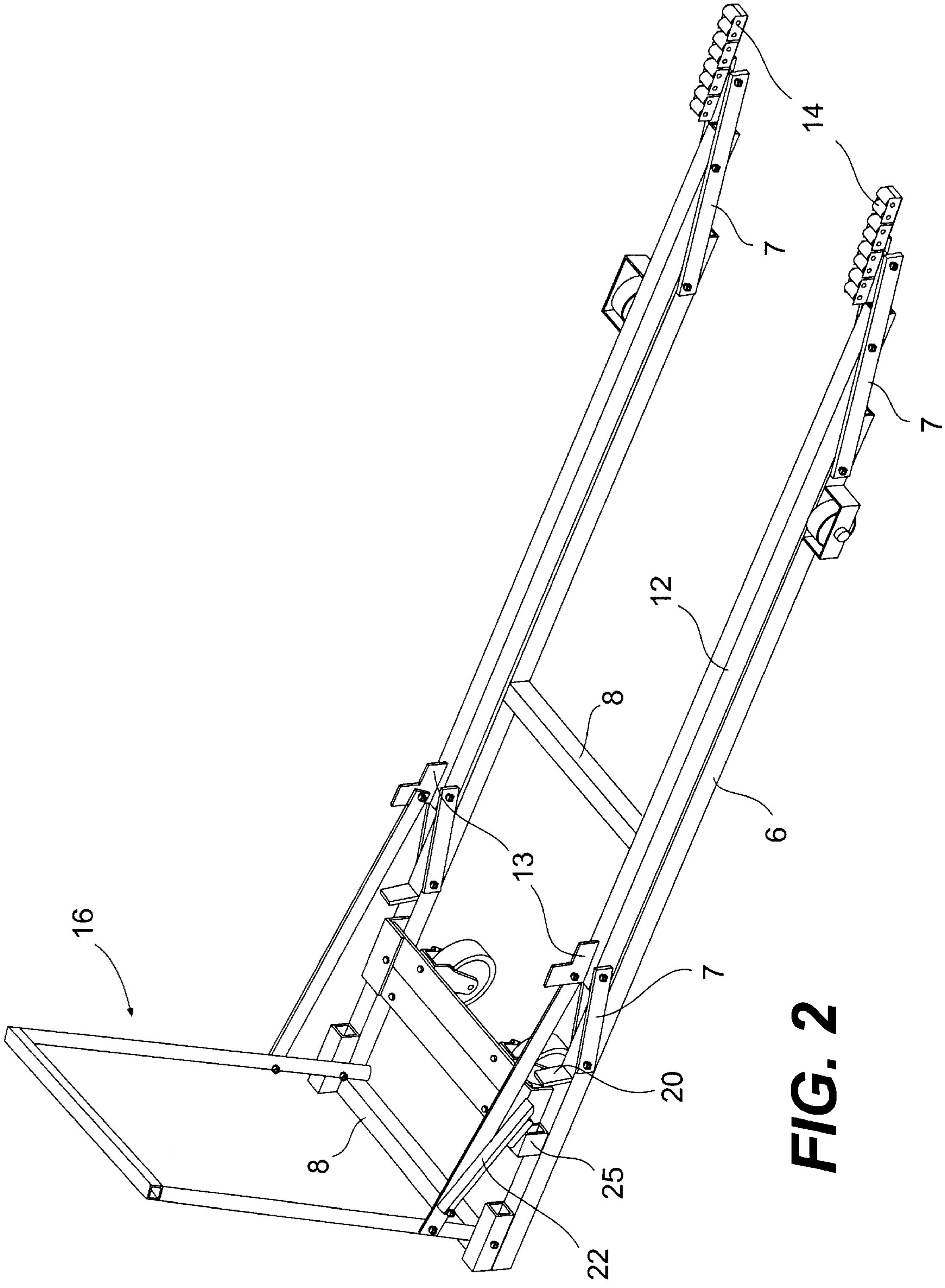
FIG. 2 is a perspective view of the snowmobile lift of the present invention in the lowered position.

The secondary frame 4 moves between its raised position shown in FIG. 1, and lowered position shown in FIG. 2, about the pivot members 7.

In the lowered position, the secondary frame 4 rests on the base frame 2 and the pivot members 7 are close to horizontal. As is shown in FIG. 1, the pivot members 7 are substantially vertical when the lift is in the raised position and support the secondary frame 4 above the base frame 2. The length of the pivot members 7 determines how high above the base frame the secondary frame is elevated. Of course, the pivot members 7 should be constructed from a material which is strong enough to support the weight of a snowmobile, for example, ¼"x1½" steep strap.

Figure 4:
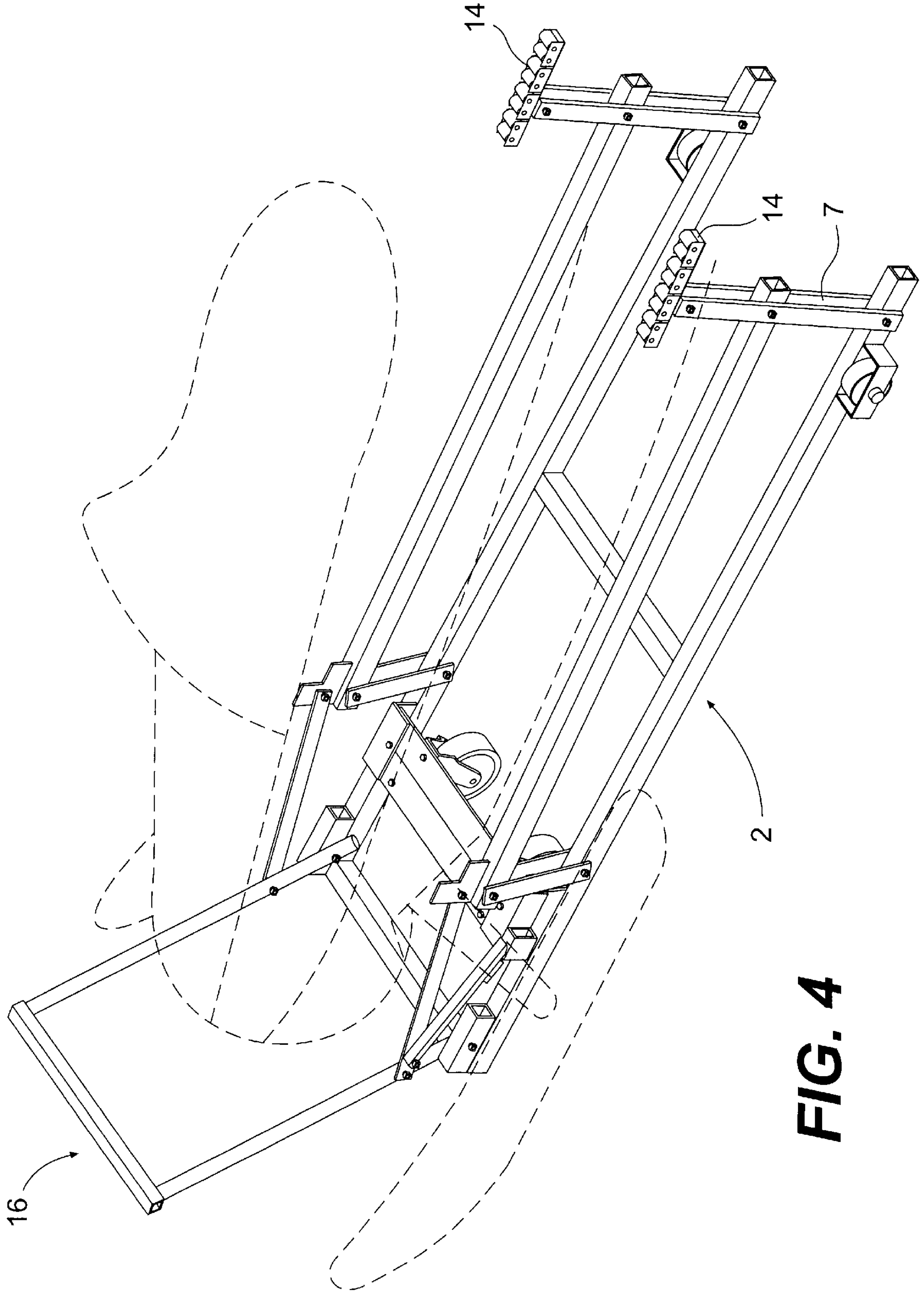
FIG. 4 is a perspective view of the snowmobile lift of the present invention in the raised position supporting a snowmobile.

The length of the secondary frame 4 is chosen so that the snowmobile is balanced on the rails 12, and therefore, there is little danger of the snowmobile being accidentally dropped. The secondary frame 4 should extend under the snowmobile from the front ski struts of the snowmobile approximately 56" towards the rear of the snowmobile. To ensure that the snowmobile is in a proper balanced position on the lift, an L-shaped guide block 13 made from a steel plate, or other suitable material, is attached to a front portion of each rail 12 of the secondary frame 4. The open portion of the L faces the rear of the lift and is adapted to engage the ski strut of a snowmobile as shown in FIG. 4. The vertically extending portion of the L-shaped guide contacts the ski strut and prevents the lift from being slid too far underneath the snowmobile. The horizontal portion of the L fits under, and supports the ski strut.

Also, to help balance of the weight of the snowmobile on the lift, support rollers 14 are provided. In this embodiment, the rear pivot members 7 extend beyond the secondary frame when the lift is in its raised position as shown in FIG. 1. The support rollers 14 are pivotably attached to the rear pivot members 7. When the lift is in the down position shown in FIG. 2, the rollers 14 allow the lift to be slid underneath the snowmobile. Once the lift is correctly positioned under the snowmobile, the support rollers 14 fit under and support the snowmobile running boards, as shown in FIG. 4. This is accomplished by choosing the length of the rear pivot members 7 appropriately. The pivotable attachment of the support rollers 14 to the rear pivot members 7 allows the rollers 14 to be self-leveling and to remain under and support the snowmobile running boards during the raising operation.

A handle 16 is provided to move the lift between its raised and lowered positions. The handle 16 is pivotally secured at one end to the base frame 2. The handle 16 is connected to the secondary frame 4 by a pair of raising arms 19. One end of each raising arm is pivotally secured to the L-shaped guide block 13 and the opposite end thereof is pivotally secured to the handle, as shown in FIG. 1. Alternatively, the raising arm may be attached to the secondary frame 4 instead of the L-shaped guide block 13. Movement of the handle 16 in a counter-clockwise direction actuates the raising arms 19 for lifting the secondary frame 4 about the pivot members 7 into the raised position, as shown in FIG. 1. The handle 16 may take several different forms and may be attached at various places to the base frame. In FIG. 1, the handle consists of two parallel rods 17 extending upwardly from the base frame 2. The rods 17 are connected by a cross member 18. The handle preferably has a length of approximately 43", which allows the average person to easily operate the lift to elevate a snowmobile and maneuver the lift into a desired position when the handle 16 has been moved to raise the snowmobile. Additionally, a spacing member 8 is preferably provided at the front of the lift as shown in FIG. 1, for example. An operator can then place one foot on the spacing member to obtain leverage to more easily actuate the handle 16 to lift the snowmobile.

A stop means 20 is provided to prevent the handle from moving the secondary frame past the raised position. The stop means 20 is preferably a steel plate attached and extending upwardly from the base frame 2 in front of the pivot members 7 (see FIG. 2). The stop means 20 is positioned on the base frame 2 to prevent the pivot members 7 from moving the secondary frame 2 past the raised position. When the secondary frame 4 reaches its raised position, the pivot members 7 contact the stop means 20, preventing further movement. Also, locating the stop means 20 in front of the pivot members 7 allows the lift to be moved on its wheels by pulling on the handle 16 without moving the secondary frame 4 forward out of the raised position.

Figure 3:
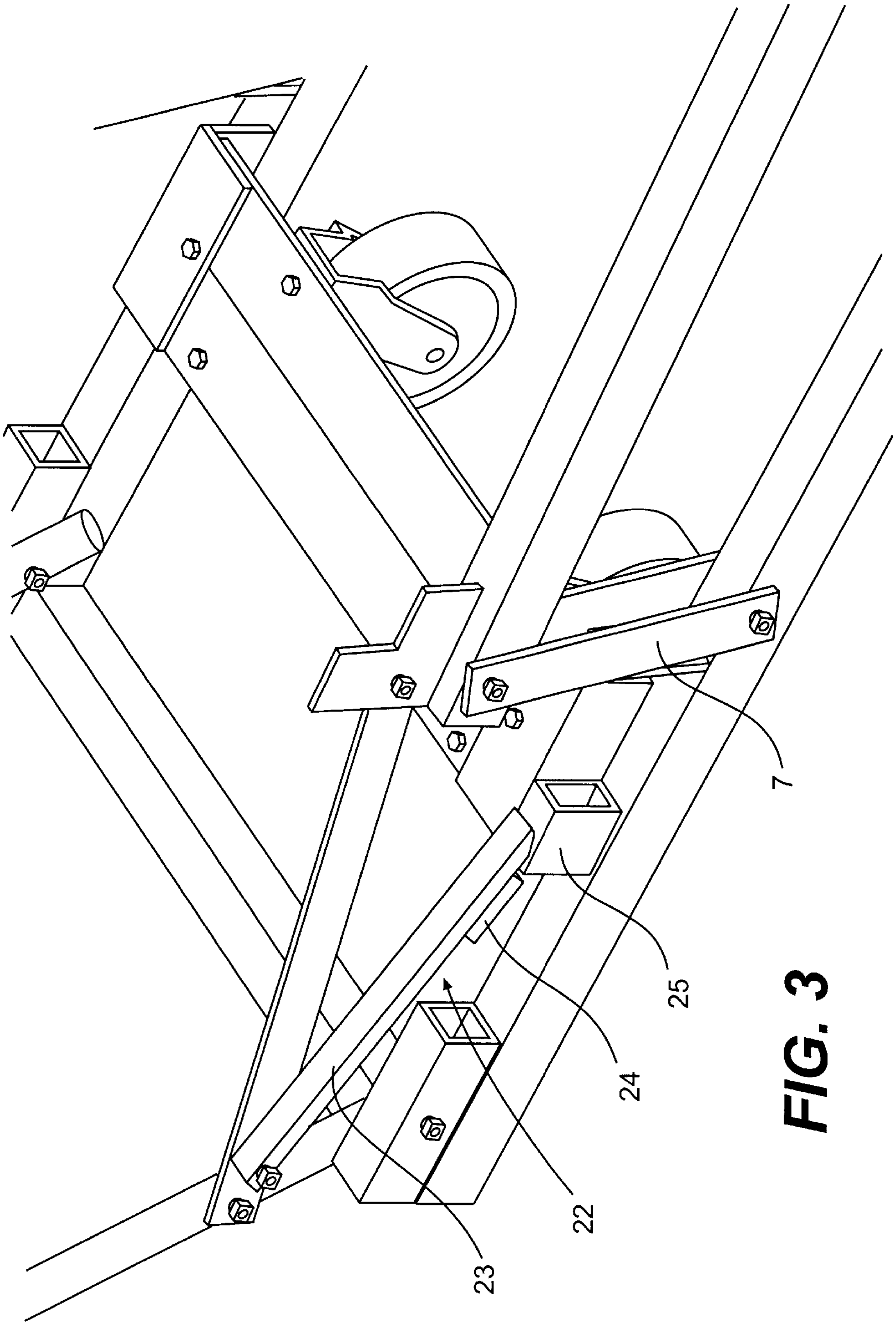
FIG. 3 is a detail of the locking bar and stop means of the present invention.

A locking bar 22 is provided as a safety mechanism to secure the secondary frame 4 in its raised position and to prevent the snowmobile from falling. Since the weight of the snowmobile is balanced on the secondary frame, very little force is exerted on the locking bar. As shown in FIG. 3, the locking bar consists of a first rod 23 which is attached at one end to a raising arm 19. The first rod 23 may alternatively be attached to the handle. A second rod 24 of a shorter length is attached to an underside of the first rod 23. The location where the second rod 23 is attached is determined by the position the locking bar 22 will be in when the secondary frame 4 is in the raised position. When the lift is in the lowered position, the second rod rests on a lock block 25 attached to base frame 2. When the handle 16 is moved to raise the secondary frame 4, the second rod 24 slides along the lock block 25 until the secondary frame 4 reaches its raised position, then the second rod 24 slides off of the edge of the lock block 25 and the locking bar 22 engages the lock block 25 at an end of the second rod 24 and an underside of the first rod 23 to secure the lift in its raised position. As mentioned above, the weight of the snowmobile is balanced on the lift so very little force is exerted on the locking bar 22. This also allows the snowmobile to be lowered easily. The locking bar 22 can easily be lifted and the handle moved to lower the snowmobile. Additionally, this arrangement of the locking bar 22 allows the lift to be moved on its wheels by pushing on the handle without moving the secondary frame from the raised position. When the handle is pushed on, the end of the second rod 24 contacts the lock block 25 preventing the lift from moving from the raised position. Thus, the combination of the stop means 20 and the locking bar 22 allow the lift to be safely maneuvered while in the raised position, without fear of the snowmobile falling.

An example of the operation of the present invention will now be given. The handle 16 is used to move the lift into its lower position, if it is not already in this position. The snowmobile lift should then appear as shown in FIG. 2. The snowmobile lift is slid under the front of a snowmobile until the L-shaped guide blocks 13 contact the ski strut of the snowmobile as shown schematically in FIG. 4. The handle 16 is used to move the snowmobile lift to its raised position. When the raised position is reached, the stop means 20 will contact the pivot members 7 to prevent the lift from moving past the raised position. Also, the locking bar 22 will engage the lock block 25 to prevent the lift from falling out of the raised position. The snowmobile lift should then appear substantially as shown in FIG. 4. Once in the raised position, the snowmobile lift may safely be maneuvered by pushing or pulling on the handle to move the snowmobile to any desired location.

Accordingly, a lift which allows one person to easily lift and maneuver a snowmobile, as well as which elevates the rear tracks of the snowmobile, has been provided.

While a preferred embodiment of the invention has been described above, since variations in the invention will be apparent to those skilled in the art, the invention should not be construed as limited to the specific embodiment described above. For example, many variations regarding the placement and connection of the various elements, such as the raising arms, are possible.

What is claimed is:

1. An apparatus for lifting an object, said apparatus comprising:

a base frame;

a secondary frame located above said base frame, said secondary frame movable between a raised position and a lowered position with respect to said base frame, in said lowered position said secondary frame substantially rests on said base frame;

pivot members movably attached to said base frame and said secondary frame about which said secondary frame moves between said lowered position and said raised position, said pivot members being adapted to be substantially vertical when said secondary frame is in said raised position;

a handle rotatably attached at one end to a front portion of said base frame and moveable between a first position corresponding to said lowered position and a second position corresponding to said raised position;

at least one raising arm pivotably attached between said handle and said secondary frame, whereby when said handle is moved from said first position to said second position said raising arm moves said secondary frame into said raised position;

a locking bar comprising a first rod of a predetermined length attached at one end to said handle and a second rod having a length shorter than said first rod, said second rod being attached to a lower side of said first rod such that said second rod rests on said base frame when said secondary frame is in said lowered position and slides along said base frame when said handle is moved from said first position to said second position, said locking bar engages a portion of said base frame at an end of said second rod and a lower side of said first rod to secure said secondary frame in said raised position; and a plurality of wheels attached to said base frame and supporting said base frame above the ground.

2. The apparatus of claim 1 wherein said object is a snowmobile.

3. A snowmobile lift comprising:

a base frame supported by a plurality of rollers for movement underneath a snowmobile;

a secondary frame including two substantially parallel rails spaced a predetermined distance apart;

means for supporting said secondary frame attached to said base frame for movement from a lowered position on said base frame to a raised position above said base frame by displacing said secondary frame longitudinally with respect to said base frame;

a handle pivotally coupled at one end to said base frame, and connected at a location spaced apart from said one end to said secondary frame, whereby said secondary frame is longitudinally displaced from said base frame by pivoting said handle about said one end, raising said secondary frame;

a plurality of supports connected to said secondary frame which engages said snowmobile when said secondary frame is raised, raising said snowmobile with said secondary frame, wherein said plurality of supports comprises a pair of substantially L-shaped guide blocks adapted to receive a ski strut of a snowmobile, each of said guide blocks being attached to a front portion of one of said parallel rails, wherein said rails are adapted to slide under a front end of a snowmobile, when in said lowered position, until said guide blocks engage said ski strut; and a pair of support rollers, each pivotably attached to a rear pivot member, said rear pivot members being sized such that said rollers fit under and support a snowmobile running board.

4. The snowmobile lift according to claim 3 wherein means for supporting comprises pivot members movably attached to said base frame and said secondary frame about which said secondary frame moves between said lowered position and said raised position.

5. The snowmobile lift according to claim 4 wherein said pivot members are adapted to be substantially vertical when said secondary frame is in said raised position.

6. The snow mobile lift according to claim 3 wherein said base frame comprises:

a pair of substantially parallel rails spaced a predetermined distance apart;

at least one spacing member connecting said rails;

two pairs of wheels located on an under side of said rails, one pair at a front portion of said rails and the other pair at a rear portion of said rails.

7. The snowmobile lift of claim 6 wherein said predetermined distance is approximately 22 inches.

8. The snowmobile lift of claim 3 wherein said predetermined distance is approximately 22 inches.

9. The snowmobile lift according to claim 3 wherein said handle comprises two substantially parallel bars, each bar attached at a first end to said base frame and connected to each other at second ends by a cross bar.

10. The snowmobile lift according to claim 9 further comprising two raising arms, each raising arm pivotably attached between said handle and one of said L-shaped guide blocks.

11. The snowmobile lift according to claim 4 further comprising a stopping means attached to said base frame, said stopping means is arranged such that at least a part of said stopping means contacts said pivot members when said secondary frame reaches said raised position.

12. The snowmobile lift according to claim 3 further comprising a locking bar comprising a first rod of a predetermined length attached at one end to said handle and a second rod having a length shorter than said first rod, said second rod being attached to a lower side of said first rod, said second rod engages a portion of said base frame with an end of said second rod and said lower side of said first rod to secure said secondary frame in said raised position.

13. The snowmobile lift according to claim 12 further comprising a lock block on said base frame for engaging said locking bar, whereby said second rod rests on said locking block when said secondary frame is in said lowered position and slides along said base frame when said handle raises said secondary frame from said lowered position to said raised position.

* * * * *